United States Patent

[11] 3,613,027

[72] Inventor Heinz Westermeier
 Neubiberg, Germany
[21] Appl. No. 50,678
[22] Filed June 29, 1970
[45] Patented Oct. 12, 1971
[73] Assignee Siemens Aktiengesellschaft
 Munich, Germany
[32] Priority July 7, 1969
[33] Germany
[31] P 19 34 414.0

[54] GAS LASER WITH COLD-CATHODE DISCHARGE
 6 Claims, 1 Drawing Fig.
[52] U.S. Cl. ...................................... 331/94.5,
 313/217, 313/220
[51] Int. Cl. ........................................ H01s 3/02
[50] Field of Search............................. 331/94.5;
 313/217, 220

[56] References Cited
 UNITED STATES PATENTS
3,495,119 2/1970 Kolb, Jr. ..................... 331/94.5 X

*Primary Examiner*—Ronald L. Wibert
*Assistant Examiner*—R. J. Webster
*Attorney*—Hill, Sherman, Meroni, Gross & Simpson ABSTRACT: A gas laser utilizing a coaxial cold-cathode discharge tube having a large-surface cylindrical cold cathode disposed in a discharge vessel enclosing one end section of a relatively thin laser capillary tube which communicates with the interior of the discharge vessel and has its opposite end extending exteriorly of such vessel and provided with an enlargement for accommodating an anode, in which the closure member for the inner end of said capillary tube is closed by a closure member, preferably in the form of a platelike member provided with a reflecting surface on the inner face thereof with the closure member being secured to the adjacent end of the capillary tube, preferably by spring means engaging both the tube and the closure member, which spring may be applied to the capillary tube prior to the insertion of the latter within the discharge vessel.

PATENTED OCT 12 1971  3,613,027
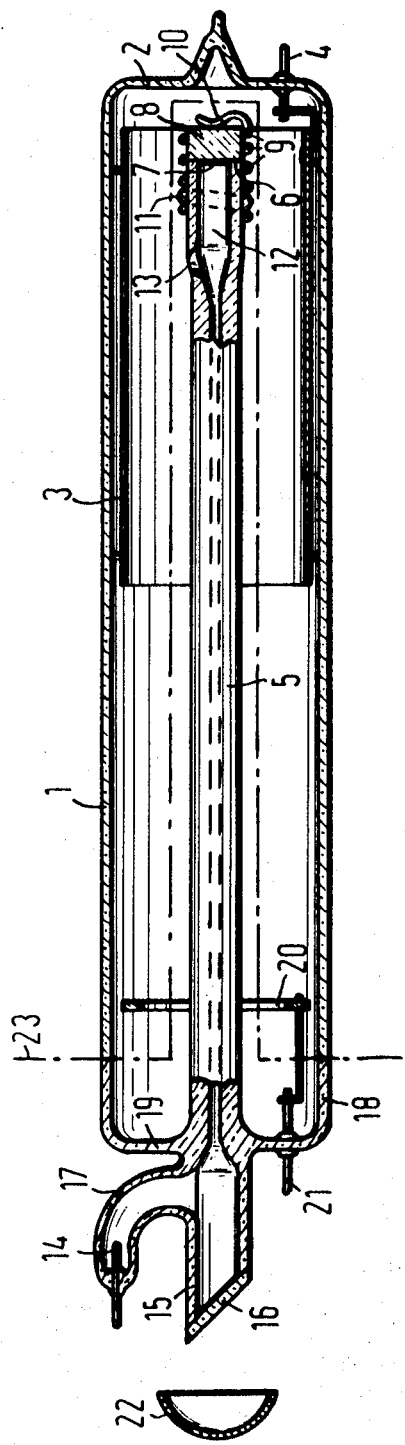
INVENTOR
Heinz Westermeier
BY
ATTYS.

GAS LASER WITH COLD-CATHODE DISCHARGE

BACKGROUND OF THE INVENTION

The invention is directed to a gas laser utilizing a coaxial cold-cathode discharge tube having a large-surface cylindrical cold cathode which is disposed in a discharge vessel enclosing one end section of a relatively thin laser capillary tube which communicates with the discharge chamber and has its opposite end extending out of the discharge vessel, which end is provided with an enlargement for accommodating the anode.

In the prior art, coaxially designed gas lasers employing cold-cathode discharge, the free end of the laser capillary tube, terminating in the interior of the discharge vessel, is open, which opening permits the inflow of electrons, emitted by the cold cathode, into the capillary tube, with such electrons maintaining the gas discharge as they travel to the anode. Extending from the inner surface of the discharge vessel, adjacent such free end of the laser capillary tube, is a connecting piece which is disposed coaxially with respect to the axis of the capillary tube and is closed by means of a glass or quartz plate forming a Brewster angle window.

In the assembly of such an arrangement, the cold cathode is initially inserted into the discharge chamber with its current supply lines conducted to the exterior through an opening in the vessel wall, which opening is subsequently closed. The laser capillary tube is then inserted into the discharge vessel from the opposite end and glazed or bonded to the internal surface facing away from the cold cathode. The respective end surfaces of the capillary tube or rather the connecting piece must be then-ground to a flat edge whereby the Brewster window, which is to be attached at the anode end of the laser capillary tube, actually extends parallel to the Brewster window closing the glass connection piece attached at the cathode end. Such grinding causes a dirtying or contaminating of the discharge vessel and thus also of the cold cathode. As is known, a perfect and efficient operation of a cold cathode is possible only if the latter is maintained extremely clean, in view of which the discharge vessel together with the cold cathode must be cleaned following the grinding operation, which causes extreme technical difficulties. Such difficulties are further aggravated by the fact that the cleaning can be effected only through the laser capillary tube or the glass connecting piece which is also very restricted.

It is not possible to avoid this drawback by also extending the cathode end of the laser capillary tube through the discharge vessel to the exterior as this would first entail the danger that the capillary tube would deform during the glazing thereof to the vessel and second, the capillary tube or the glass vessel would burst during operation due to the differences of thermic expansion as the capillary tube always is considerably warmer during operation than the wall of the discharge vessel.

The invention therefore is directed to the problem of providing a gas laser, utilizing a cold cathode which avoids the disadvantages of a subsequent contamination of the cold cathode during assembly of the arrangement. In the solution of this problem, according to the invention, the gas laser is provided with a capillary tube which extends into the discharge vessel and is provided with a closure member seated on the end of such tube, which closure member carries a reflecting surface or mirror of the laser resonator. The closure member thus advantageously may be constructed in the form of a platelike piece which is provided with a reflecting surface, preferably a fully reflecting surface, so that the opposite surface does not have to be formed as a uniform plane surface as it is not necessary to have any radiation transmitted therethrough to the exterior. The addition of the closure member which carries the reflecting surface can be accomplished in a very simple manner if the cathode end of the capillary tube has its end edge surface ground and the closure member carrying the reflective surface is pressed thereagainst by means of a spring, such as a coil spring which may be screwed onto the capillary tube prior to insertion of the latter into the vessel.

BRIEF DESCRIPTION OF THE DRAWINGS

The single FIGURE of the drawing schematically represents a longitudinal cross section of a gas laser structure of the general type described, incorporating the invention.

DETAILED DESCRIPTION OF THE INVENTION

Referring to the drawing, the reference numeral 1 indicates a tubular glass structure forming a part of the discharge vessel, formed with an end portion 2, in which is disposed a large-surface cylindrical hollow cathode 3, the latter, in the embodiment illustrated, being supported within the vessel 1 by generally radially extending spacing elements projecting outwardly from the cathode 3 into engagement with the vessel sidewall, or if the structure possesses sufficient mechanical rigidity it may be supported by the voltage supply line 4 for the cathode which extends through the end wall of the portion 2 and is glazed or sealed thereto.

The capillary tube 5 is disposed within the vessel 1, being rigidly supported from the opposite end thereof with the open inner end of the tube free standing within the vessel and having its end edge 6 surface ground to extend in a plane exactly normal to the axis of the capillary tube 5.

Such end 6 of the tube 5 is closed by a platelike member 8 which is provided at its inner face adjacent the end 6 with a reflecting surface or mirror 7, the member 8 preferably being seated, on the surface ground end 6 of the capillary tube, the closure member being retained in operative position by a spring member 9, illustrated as being in the form of a coil spring, the coils of which may be screwed onto the extension of the capillary tube. Preferably the outer transverse dimension or diameter of the closure member 8 is substantially equal to the corresponding dimension of the adjacent end portion of the capillary tube 5 whereby coils of such spring may also encircle the closure member with free end of the spring being provided with a generally diametrically extending end portion 10 formed to engage the adjacent external face of the closure member 8, firmly retaining the same with the end 6 of the capillary tube. Suitable means such as a glass thread portion 11, having an inclination corresponding to the pitch of the spring 9, may be suitably formed on the external surface of the capillary tube, such thread being suitably formed on or applied to the tube and providing anchoring means for the spring. It will be appreciated that, if desired, equivalent anchoring means may be employed, as for example, two diametrically opposite pins extending radially outwardly from the surface of the capillary tube and offset axially about one-half of the pitch of the spring 9, or if the thickness of the capillary tube permits, a suitably proportioned helical groove may be ground or otherwise formed in the adjacent peripheral surface of the capillary tube.

The tube 5 is provided, preferably immediately ahead of the enlarged end section 12 thereof, which is closed by the member 8 carrying the reflective surface, with a transverse or generally radially extending opening 13 through which electrons emitted from the cold cathode 3 can enter the interior of the capillary tube and travel therethrough to the anode 14. The second reflecting surface or mirror of the laser resonator can be disposed directly at the left end 15 of the laser capillary tube which extends outwardly from the discharge chamber. However, it is preferable to close the end 15 of the capillary tube by means of a platelike member 16 forming a Brewster window, as illustrated in the drawing, and to provide an external second mirror 22, preferably a concave reflector, which permits subsequent adjustment thereof with respect to the reflecting surface. The capillary tube is glazed or sealed, intermediate the extension or enlargement 17 containing the anode 14 and the reflecting surface 7 to the end portion 18 forming a part of the discharge vessel with the adjacent end of the latter being provided with a suitable getter device 20, illustrated as being directly attached to the end wall 19 by a rod or member 21 extending through the end wall 19, which rod forms the support for the getter 20.

In the construction and assembly of the structure illustrated in the drawing, the discharge vessel 1 is initially fabricated in two parts, namely, the portion 2 and the opposite portion 18 carrying the end wall 19 from which the capillary tube 5 is supported. The structure thus may be initially formed into two sections or subassemblies initially separated along the broken line 23.

Thus, the right-hand section may be initially formed and provided with the cold cathode 3, as previously described, and the opposite section suitably assembled, with the end portion 18 being glazed or otherwise suitably sealed to the adjacent end of the capillary tube 5, the end 6 of the capillary tube being preground and having assembled thereon the closure member 8 and spring 9 as described. Likewise the getter device 20 may be suitably mounted on the end wall 19, for example, by means of the supporting rod 21 and the closure plate 16 attached to the adjacent end 15 of the capillary tube. It will be noted that the end portion 18 is of substantially identical transverse dimension as the opposite section of the closure vessel so that upon completion of the two subassemblies, the capillary tube may be inserted into the closure vessel whereby the adjacent edges of the two sections will meet along the line 23, at which they may be suitably sealed.

It will be noted that in accordance with the invention, the glass tube containing the hollow cathode 3 can be produced as a single part which may be readily cleaned and suitably stored. The left-hand section may be readily assembled including the grinding of the end 6 of the laser capillary tube 5 and the closure member 8 secured thereto by means of the spring 9, as well as the assembly of the plate 16. This section likewise can be readily cleaned following complete assembly without any difficulties as practically only glass parts are involved. As the assembly of the two sections may be readily accomplished without further contamination of any parts of the structure such assembly may be readily accomplished and it will be particularly noted that the assembly of the two sections and in particular the axial alignment thereof is not critical as it is not important that the axis of the capillary tube 5 lie exactly coaxial or parallel to the axis of the cold cathode 3.

In comparison, in the prior arrangement in which the capillary tube is open at the end 6 and a glass connecting piece is provided at the end of the portion 2, which is closed by means of a Brewster window, contamination of the cold cathode results from the grounding of the end face of the capillary tube, and the opposite end 15 of the capillary tube must be opened up to permit a subsequent cleaning operation. The cleaning of the sensitive emitting surface of the cold cathode, which is extremely difficult in any event, can thus be effected only through the relatively small openings in the connecting piece as well as at the end 15 of the capillary tube which results in many cases of a contaminating residue being retained in the cold cathode due to the failure to effectively clean the system.

However, by closing the free end 6 of the capillary tube 5 with the closure member 8 carrying the reflective surface of the resonator arrangement, such problem is eliminated by the present invention in a very simple manner.

However, it will be appreciated that the invention is not restricted to the illustrative embodiment as it may be desirable in other applications of the invention to attach the second resonator mirror or reflective surface directly at the end 15 of the capillary tube and to design the anode 14 and its cooperable structure 17 in a different manner.

Having thus described my invention, it will be apparent that various other and material modifications may be made in the same without departing from the spirit of my invention, hence I do not wish to be understood as limiting myself to the exact form and arrangement of parts herein shown and described.

I claim as my invention:

1. In a gas laser discharge device including a discharge vessel, an elongated capillary discharge tube having one end portion thereof extending through a sidewall of the discharge vessel and rigidly fixed thereto in sealed relation therewith, with the opposite end portion of said tube being enclosed by said vessel, a cathode operatively disposed in said vessel adjacent the inner end of said tube, and laser resonator means including a pair of reflectors respectively disposed at opposite ends of said capillary tube, the combination of said capillary tube having an open inner end, and a closure member for said open end, said closure member being seated on such end and provided with a reflective surface forming one of the reflectors of said laser resonator means, said capillary tube having an opening in its sidewall adjacent said cathode operative to permit flow of electrons emitted by the cathode into the capillary tube.

2. A gas laser discharge device according to claim 1 wherein the closure member is in the form of a plate on whose inner planar face is disposed said reflective surface.

3. A gas laser discharge device according to claim 2, wherein said planar reflecting surface is fully reflecting.

4. A gas laser discharge device according to claim 2, wherein the cathode end of the capillary tube is surface ground and the closure member carrying the reflective surface is seated thereon, and spring means carried by the capillary tube for retaining said closure member in operative position.

5. A gas laser discharge device according to claim 4, wherein said spring means comprises a coiled spring, the coils of which encircle and frictionally engage the outer surface of the capillary tube.

6. A gas laser discharge device according to claim 5, wherein the transverse dimensions of said closure member are substantially the same as those of the adjacent end portion of the said capillary tube and coils of said spring encircle and frictionally engage the closure member, with the adjacent free end of the spring engaging the outer end face of said closure member.